(12) United States Patent
Orsatti et al.

(10) Patent No.: US 9,920,642 B2
(45) Date of Patent: Mar. 20, 2018

(54) COMPRESSOR AIRFOIL

(71) Applicant: ANSALDO ENERGIA IP UK LIMITED, London (GB)

(72) Inventors: Richard Orsatti, Jupiter, FL (US); Edward Len Miller, Jupiter, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 448 days.

(21) Appl. No.: 14/195,430

(22) Filed: Mar. 3, 2014

(65) Prior Publication Data

US 2014/0271171 A1 Sep. 18, 2014

Related U.S. Application Data

(60) Provisional application No. 61/793,809, filed on Mar. 15, 2013.

(51) Int. Cl.
*F01D 9/04* (2006.01)
*F01D 25/24* (2006.01)
*B23K 101/00* (2006.01)

(52) U.S. Cl.
CPC ........... *F01D 9/044* (2013.01); *F01D 25/246* (2013.01); *B23K 2201/001* (2013.01); *Y10T 29/49337* (2015.01)

(58) Field of Classification Search
CPC ........................................................ F01D 9/044
USPC ......................................................... 415/209.4
See application file for complete search history.

(56) References Cited

U.S. PATENT DOCUMENTS

| | | | | |
|---|---|---|---|---|
| 3,182,955 A * | 5/1965 | Hyde | ................. | F01D 5/08 29/889.21 |
| 4,195,396 A * | 4/1980 | Blazek | ................. | B23P 15/04 164/122.1 |
| 6,910,854 B2 * | 6/2005 | Joslin | ................. | F01D 5/225 415/139 |
| 6,984,101 B2 * | 1/2006 | Schiavo, Jr. | ......... | F01D 5/187 415/115 |
| 7,334,306 B2 * | 2/2008 | Beverley | ............ | B23Q 3/063 269/909 |
| 7,762,761 B2 * | 7/2010 | Busch | ................. | F01D 9/042 415/1 |
| 7,922,444 B2 * | 4/2011 | Propheter-Hinckley | | F01D 11/005 29/888.3 |
| 2008/0050156 A1 * | 2/2008 | Yamanouchi | ....... | G03G 9/0804 399/329 |
| 2008/0148737 A1 * | 6/2008 | Ellis | ................. | F01D 11/08 60/796 |
| 2010/0232934 A1 * | 9/2010 | Burdgick | ............ | F01D 9/044 415/151 |

* cited by examiner

*Primary Examiner* — Richard Edgar
*Assistant Examiner* — Michael Sehn
(74) *Attorney, Agent, or Firm* — Hovey Williams LLP

(57) ABSTRACT

Aspects of the present invention relate to systems and methods of a vane design utilizing welding techniques. The present invention concerns a method for preventing cracking within a vane assembly utilizing full penetration welding. Additional embodiments concern a vane design that, when assembled with another vane, comprises an axial slot that prevents cracking within a vane assembly.

11 Claims, 4 Drawing Sheets

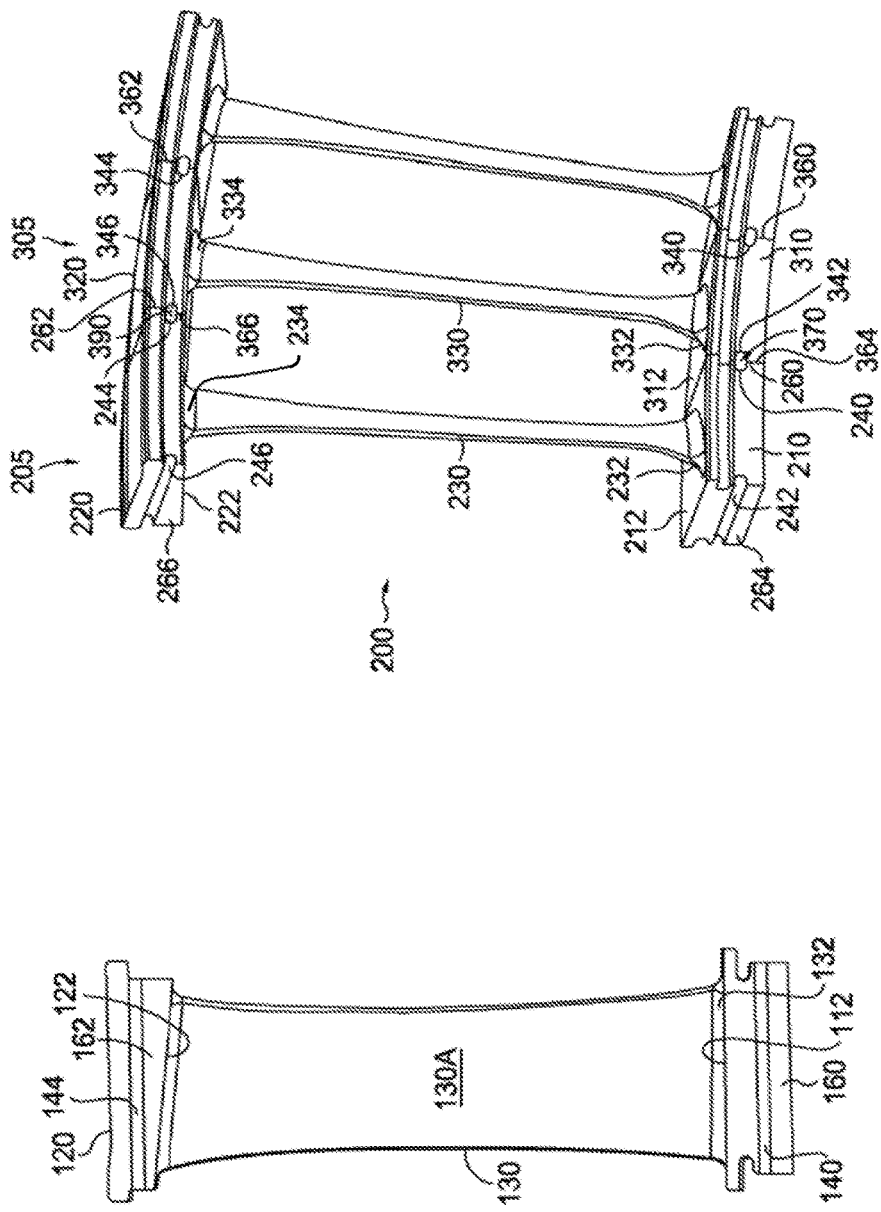

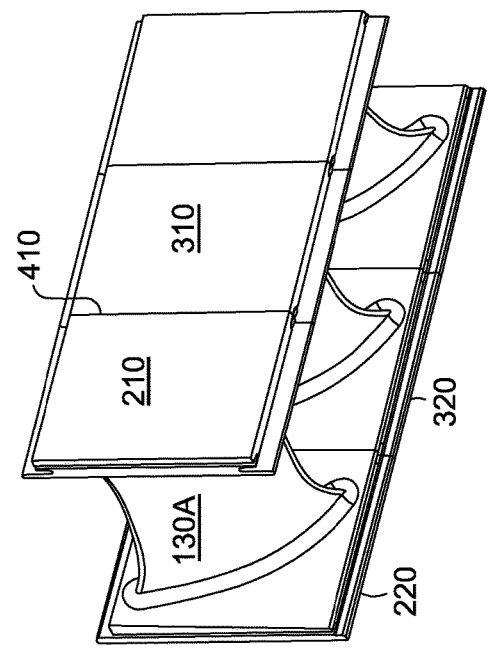
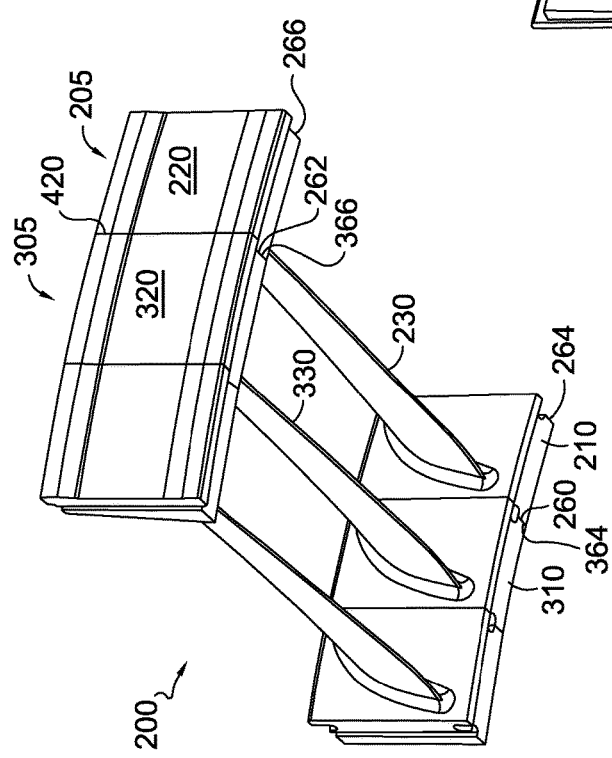

COMPRESSOR AIRFOIL

CROSS-REFERENCE TO RELATED APPLICATIONS

This application claims priority to U.S. Provisional Patent Application Ser. No. 61/793,809, filed on Mar. 15, 2013.

TECHNICAL FIELD

The present invention generally relates to a compressor vane assembly and more specifically to methods and systems for welding compressor vanes so as to reduce the occurrence of cracks.

BACKGROUND OF THE INVENTION

Compressor components having an airfoil, such as a compressor blade, are held within a rotating disk or shaft and are designed to rotate at a high rate of speed in order to compress a fluid passing through, such as air. A compressor typically comprises a plurality of stages, or rotating disks of blades, of diminishing diameter that raise the pressure and temperature, of the working fluid at each stage to a pre-determined level at the compressor exit.

Axial compressors having multiple stages are commonly used in gas turbine engines for increasing the pressure and temperature of air to a pre-determined level at which point fuel can be mixed with air and the mixture ignited. The hot combustion gases then pass through a turbine to provide either a propulsive output or mechanical output.

A series of vanes may be welded together to form a vane assembly. However, typical welding techniques and vane designs have permitted cracks to permeate through the welds and airfoils. Cracking may impact the integrity of the vane assembly and thus, the turbine engine.

SUMMARY

In accordance with the present invention, there is provided a novel and improved system and method for welding a vane assembly. An embodiment of the present invention provides a vane assembly for use in a welded vane assembly. An alternate embodiment of the present invention concerns a welded vane assembly configured to prevent cracking in the welds of the vane assembly. In yet another embodiment of the present invention, a method of preventing cracking within a vane assembly utilizing an improved welding joint.

In an embodiment of the present invention, a vane assembly for use in a welded vane assembly is disclosed. The vane assembly comprises an inner shroud having first and second inner sidewalls with the first and second inner sidewalls each having an inner groove. The vane assembly has an airfoil extending from the inner gas path surface of the inner shroud to an outer gas path surface of an outer shroud. The outer shroud has opposing first and second outer sidewalls, where each outer sidewall has a groove. The inner and outer grooves are positioned a distance through the radial thickness of the inner and outer sidewalls.

In an alternate embodiment of the present invention, a welded vane assembly is disclosed comprising a first and second vane assembly which are welded together along a joint formed between adjacent inner and outer sidewalls. A full penetration weld is achieved along the joint due to an inner and outer channel being formed through grooves in the inner and outer sidewalls of adjacent vanes. Each of the first and second vane assembly has an inner shroud having first and second inner sidewalls with the first and second inner sidewalls each having an inner groove. The vane assembly has an airfoil extending from the inner gas path surface of the inner shroud to an outer gas path surface of an outer shroud. The outer shroud has opposing first and second outer sidewalls, where each outer sidewall has a groove. The inner and outer grooves are positioned a distance through the radial thickness of the inner and outer sidewalls.

In yet another embodiment of the present invention, a method of reducing cracks in a welded vane assembly is disclosed. The method comprises the steps of providing first and second vane assemblies, each having an inner shroud with first and second inner sidewalls with the first and second inner sidewalls each having an inner groove. The vane assembly has an airfoil extending from the inner gas path surface of the inner shroud to an outer gas path surface of an outer shroud. The outer shroud has opposing first and second outer sidewalls, where each outer sidewall has a groove. The inner and outer grooves are positioned a distance through the radial thickness of the inner and outer sidewalls. The first vane assembly is positioned adjacent the second vane assembly such that the respective inner sidewalls and outer sidewalls are positioned adjacent to each other such that the first vane assembly is secured to the second vane assembly along an interface region of each of the first and second inner and outer shrouds.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 1D is an opposing elevation view of the vane of FIG. 1C in accordance with an embodiment of the present invention;

FIG. 2 is a perspective view of a vane assembly in accordance with an embodiment of the present invention;

FIG. 3 is an alternate perspective view of the vane assembly of FIG. 2 in accordance with an embodiment of the present invention;

FIG. 4 is an alternate perspective view of the vane assembly of FIG. 2 in accordance with an embodiment of the present invention; and, FIG. 5 is a detailed perspective view of a portion of the vane assembly of FIG. 2 in accordance with an embodiment of the present invention.

DETAILED DESCRIPTION

Figure 1C:
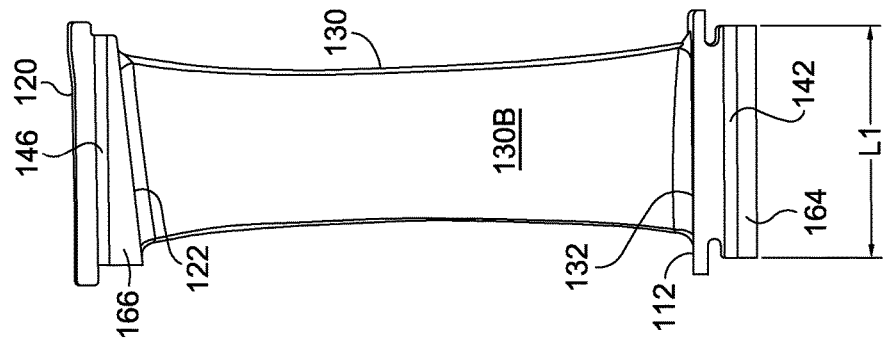
FIG. 1C is an elevation view in accordance with an embodiment of the present invention.
Figure 1B:
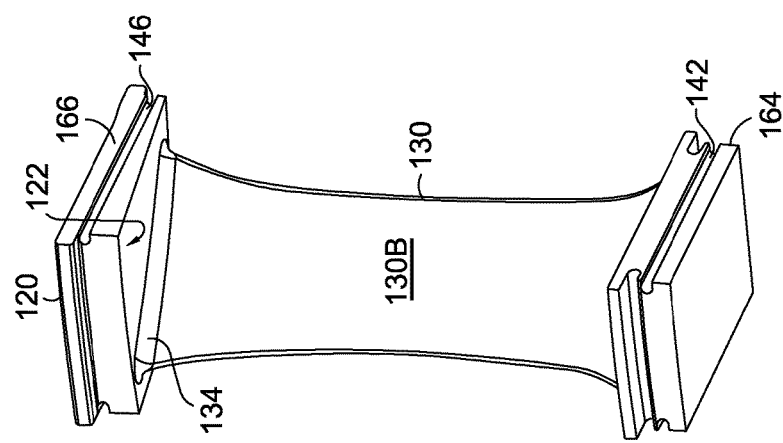
FIG. 1B is an alternate perspective view in accordance with an embodiment of the present invention.
Figure 1A:
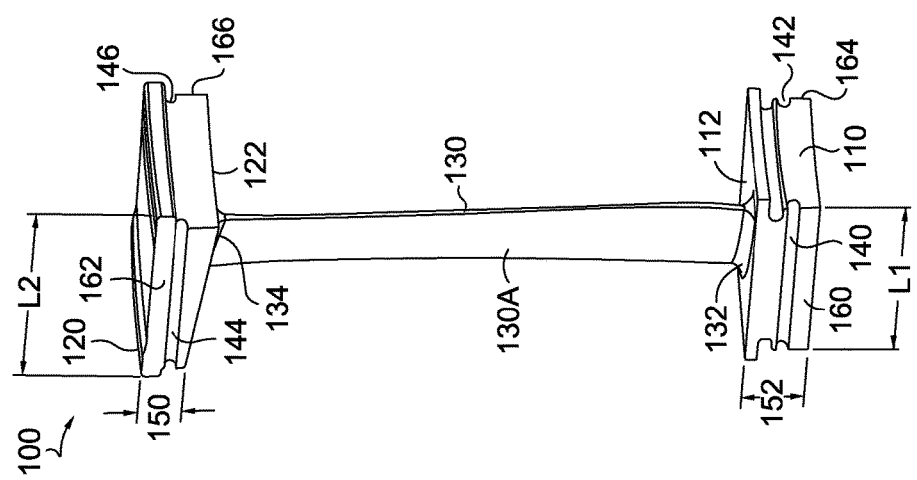
FIG. 1A is a perspective view of a vane in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

The present invention is described in detail in relation to FIG. 1A-FIG. 5 and can be applied to a variety of vane and vane assemblies. Referring initially to FIG. 1A-1D a vane assembly 100 includes an inner shroud 110 having an inner gas path surface 112 which defines a portion of the inner flow path wall at a particular location within an engine. An airfoil 130 extends radially outward from inner gas path surface 112 of the inner shroud 110 from a root 132 toward a tip 134. The airfoil 130 is attached to the inner shroud 110 proximate the root 132 of the airfoil 130. The airfoil 130 can be integrally formed with the inner shroud 110 through a casting or forging process or the like, or alternatively, may be mechanically joined via welding, brazing or by any other joining method known to those skilled in the art. An outer shroud 120 can be attached to the airfoil 130 proximate the tip 134. The outer shroud 120 includes an outer gas path surface 122 which may form a portion of the outer flow path in a turbine section of an engine.

The vane assembly 100 also comprises a plurality of grooves 140, 142, 144, and 146. A first inner groove 140 is located along a first inner sidewall 160 of inner shroud 110. In some embodiments, a length of groove 140 runs along the entire length of the first inner sidewall 160 of inner shroud 110. In other embodiments, the groove 140 may extend approximately between 25% and 75% of the length of the first inner sidewall 160 of the inner shroud 110. A second inner groove 142 is located on a second inner sidewall side 164 opposite of the first inner sidewall 160 of the shroud 110. Similar to the first inner groove 140, the second inner groove 142 may comprise a length equal to a length of the second inner sidewall 164 or length between 25% and 75% of the length of the second inner sidewall 164 of shroud 110. First outer groove 144 is located along a first outer sidewall 162 of the outer shroud 120. A length of the first outer groove 144 may comprise a length equal to a length of the first outer sidewall 162 or extend approximately 25%-75% of the length of the first outer sidewall 162 of the outer shroud 120. Second outer groove 146 is located along a second outer sidewall 166 (not shown) of the outer shroud 120. A length of the second outer groove 146 may comprise a length equal to a length of the second outer sidewall 166 or extend approximately 25%-75% of the length of the second outer sidewall 166 of the outer shroud 120. Outer sidewalls 162 and 166 may mirror the inner sidewalls 160 and 164, respectively.

An alternate embodiment of the present invention is depicted in FIGS. 2-5, where a welded vane assembly is depicted. In embodiments of the present invention, full penetration welding may be used to weld a first vane assembly to a second vane assembly. Full penetration welding involves consuming a portion of the inner shroud 110 and/or outer shroud 120, to be welded to a portion of a corresponding inner or outer shroud of an adjacent vane. Embodiments of the present invention may also utilize partial penetration welding in combination with features of vane assembly 100 to prevent cracking within the vane assembly.

Referring to FIG. 2, a welded vane assembly 200 comprising a first vane assembly 205 and a second vane assembly 305, where the first vane assembly 205 is secured to the second vane assembly 305. The first vane assembly 205 and second vane assembly 305 are each similar to the vane assembly 100 of FIGS. 1A-1D. More specifically, the first vane assembly 205 includes an inner shroud 210 having an inner gas path surface 212 which defines a portion of the inner flow path wall at a particular location within an engine. A first airfoil 230 extends radially outward from inner gas path surface 212 of the inner shroud 210 from a root 232 toward a tip 234. The first airfoil 230 is attached to the inner shroud 210 proximate the root 232 of the first airfoil 230. The first airfoil 230 can be integrally formed with the inner shroud 210 through a casting or forging process or the like, or alternatively may be mechanically joined via welding, brazing or by any other joining method known to those skilled in the art. An outer shroud 220 can be attached to the airfoil 230 proximate the tip 234. The outer shroud 220 includes an outer gas path surface 222 which may form a portion of the outer flow path in a turbine section of an engine.

Figure 5:
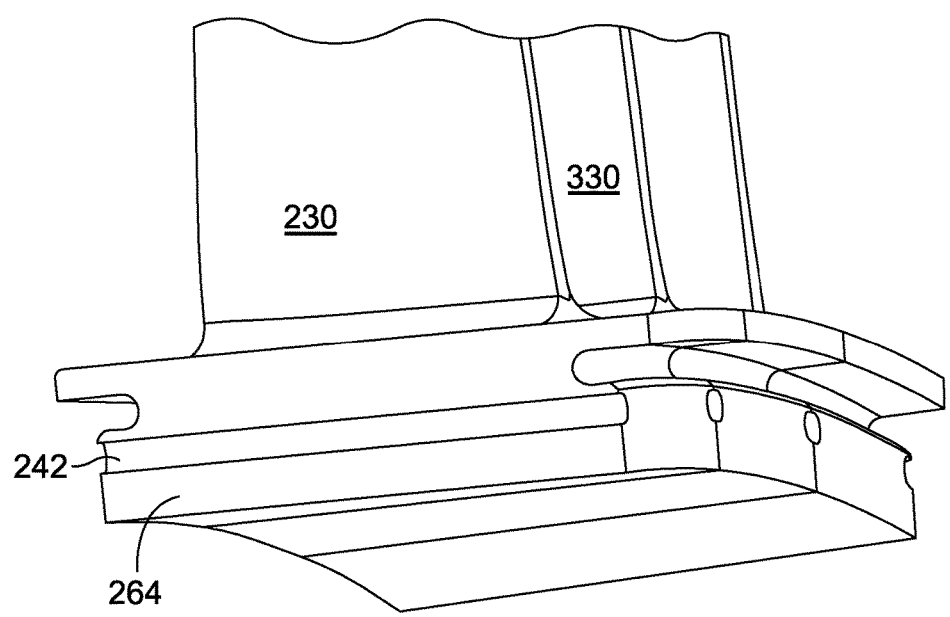

The first vane assembly 205 also comprises a plurality of grooves 240, 242, 244, and 246, some of which may be visible in FIGS. 3-5, but others of which may not be clear, but are understood to be similar to features of the vane assembly of FIGS. 1A-1D. A first inner groove 240 is located along a first inner sidewall 260 of inner shroud 210. In some embodiments, a length of groove 240 runs along the entire length of the first inner sidewall 260 of inner shroud 210, but can also extend a shorter distance, approximately between 25% and 75% of the length of the first inner sidewall 260 of the inner shroud 210. A second inner groove 242 is located on a second inner sidewall side 264 opposite of the first inner sidewall 260 of the shroud 210. Similar to the first inner groove 240, the second inner groove 242 may comprise a length equal to a length of the second inner sidewall 264 or length between 25% and 75% of the length of the second inner sidewall 264 of shroud 210. First outer groove 244 is located along a first outer sidewall 262 of the outer shroud 220, while a second outer groove 246 is located along a second outer sidewall 266. The length of the first outer groove 244 and second outer groove 246 may comprise a length equal to a length of the first outer sidewall 262 and second outer sidewall 266, respectively. Alternatively, the first and second outer grooves 244 and 246 can extend approximately 25%-75% of the length of the first outer sidewall 262 or second outer sidewall 266 of the outer shroud 220. Outer sidewalls 264 and 266 may mirror the inner sidewalls 260 and 262, respectively.

The second vane assembly 305 is also depicted in FIGS. 2-4. The second vane assembly 305 is a vane generally similar to that of the first vane assembly 205. More specifically, the second vane assembly 305 of the welded vane assembly 200 comprises an inner shroud 310 having an inner gas path surface 312 which defines a portion of the inner flow path wall at a particular location within an engine. A second airfoil 330 extends radially outward from inner gas path surface 312 of the inner shroud 310 from a root 332 toward a tip 334. The second airfoil 330 is attached to the inner shroud 310 proximate the root 332 of the second airfoil 330. The second airfoil 330 can be integrally formed with the inner shroud 310 through a casting or forging process or the like, or alternatively may be mechanically joined via welding, brazing or by any other joining method known to those skilled in the art. An outer shroud 320 can be attached to the airfoil 330 proximate the tip 334. The outer shroud 320 includes an outer gas path surface 322 which may form a portion of the outer flow path in a turbine section of an engine.

The second vane assembly 305 also comprises a plurality of grooves 340, 342, 344, and 346, some of which may be visible in FIG. 2, but others of which may not be clear, but are understood to be similar to features of the vane assembly of FIG. 1. A first inner groove 340 is located along a first inner sidewall 360 of inner shroud 310. In some embodiments, a length of groove 340 runs along the entire length of the first inner sidewall 360 of inner shroud 310, but can also extend a shorter distance, approximately between 25% and 75% of the length of the first inner sidewall 360 of the inner shroud 310. A second inner groove 342 is located on a second inner sidewall side 364 opposite of the first inner sidewall 360 of the shroud 310. Similar to the first inner groove 340, the second inner groove 342 may comprise a length equal to a length of the second inner sidewall 364 or length between 25% and 75% of the length of the second inner sidewall 364 of shroud 310. First outer groove 344 is located along a first outer sidewall 362 of the outer shroud 320, while a second outer groove 346 is located along a second outer sidewall 366. The length of the first outer groove 344 and second outer groove 346 may comprise a length equal to a length of the first outer sidewall 362 and second outer sidewall 366, respectively. Alternatively, the first and second outer grooves 344 and 346 can extend approximately 25%-75% of the length of the first outer sidewall 362 or second outer sidewall 366 of the outer shroud 320. Outer sidewalls 364 and 366 may mirror the inner sidewalls 360 and 362, respectively.

In the welded vane assembly 300 depicted in FIGS. 2-5, the first and second vane assemblies 205 and 305, respectively, are aligned at their inner shrouds 210 and 310 and outer shrouds 220 and 320. More specifically, as it can be seen from FIGS. 3 and 4, which are top and bottom perspective views of the vane assembly 200, with the shrouds 210 and 310 aligned as shown in FIG. 3. A weld is placed along the shroud joint 410, securing the shroud 210 of the first vane assembly 205 to the shroud 310 of the second vane assembly 305. The weld penetrates a portion of the thickness of the shrouds 210 and 310 until the channel 370 is reached. The welded vane assembly 200 comprises an inner channel 370 formed when the first inner groove 240 of the first inner sidewall 260 aligns with the second inner groove 342 in the second inner sidewall 364 of the second vane assembly 305. The weld extends the length L1 of the inner shroud joint 410 and can be performed by TIG, electron beam or other acceptable welding technique.

The welded vane assembly 200 also comprises a welded joint 420 at the intersection of the first outer shroud 220 and the second outer shroud 320, as shown in FIG. 4. The weld is placed along the joint, through at least a portion of the thickness of the shrouds 220 and 320, such that the weld penetrates to the channel 390, where the channel 390 is formed by grooves 244 in the first outer sidewall 262 and a groove 346 in the second outer sidewall 366. As with the shroud joint 410, the joint extends the length L2 of the outer shrouds.

As it can be seen by FIG. 2, the channels 370 and 390 have a generally "racetrack" or overall cross sectional shape. This shape is a result of the shape of the grooves 240 and 342 which form channel 370 and the grooves 244 and 346 which form the channel 390. Alternatively, the channels 370 and 390 can have a circular cross section, or any other desired cross-sectional shape.

In an embodiment of the present invention, a method of reducing cracks in a welded vane assembly is disclosed. A first vane assembly and second vane assembly, as discussed above are provided. The first vane assembly 205 is positioned adjacent the second vane assembly such that the first inner sidewall of the first vane assembly contacts the second inner sidewall of the second vane assembly and a first outer sidewall of the first vane assembly contacts the second outer sidewall of the second vane assembly. The first vane assembly is then secured to the second vane assembly along an interface region (joint between adjacent vanes). The first vane assembly and second vane assembly are joined together by a full penetration weld.

The present invention has been described in relation to particular embodiments, which are intended in all respects to be illustrative rather than restrictive. Alternative embodiments and required operations will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A welded vane assembly comprising:
a first vane assembly having:
a first inner shroud having a first inner sidewall, an opposing second inner sidewall, an inner radial thickness extending from an inner gas path surface to a radially innermost surface of the first inner shroud, and an inner length, the first inner sidewall having a first inner groove and the second inner sidewall having a second inner groove, wherein no portion of the first inner groove or the second inner groove extends radially inward from an outermost portion of the radially innermost surface;
a first airfoil extending radially outward from the inner gas path surface; and
a first outer shroud coupled to the first airfoil and having a first outer sidewall, an opposing second outer sidewall, an outer radial thickness extending from an outer gas path surface to a radially outermost surface of the first outer shroud, and an outer length, the first outer sidewall having a first outer groove and the second outer sidewall having a second outer groove, wherein no portion of the first outer groove or the second outer groove extends radially outward from an innermost portion of the radially outermost surface;
a second vane assembly having:
a second inner shroud having a first inner sidewall, an opposing second inner sidewall, an inner radial thickness extending from an inner gas path surface to a radially innermost surface of the first inner shroud, and an inner length, the first inner sidewall having a first inner groove and the second inner sidewall having a second inner groove, wherein no portion of the first inner groove or the second inner groove extends radially inward from an outermost portion of the radially innermost surface;
a second airfoil extending radially outward from the inner gas path surface; and
a second outer shroud coupled to the second airfoil and having a first outer sidewall, an opposing second outer sidewall, an outer radial thickness extending from an outer gas path surface to a radially outermost surface of the second outer shroud, and an outer length, the first outer sidewall having a first outer groove and the second outer sidewall having a second outer groove, wherein no portion of the first outer groove or the second outer groove extends radially outward from an innermost portion of the radially outermost surface;

wherein the inner sidewall of the first vane assembly contacts the inner sidewall of the second vane assembly and the outer sidewall of the first vane assembly contacts the outer sidewall of the second vane assembly such that the inner grooves of the inner sidewalls form an inner channel and the outer grooves of the outer sidewalls form an outer channel and the first vane assembly is welded to the second vane assembly.

2. The welded vane assembly of claim 1, wherein the first and second inner grooves extend the inner length of the inner shroud.

3. The welded vane assembly of claim 1, wherein the first and second outer grooves extend the outer length of the outer shroud.

4. The welded vane assembly of claim 1, wherein the inner channel and outer channel each have a racetrack or oval shape.

5. The welded vane assembly of claim 1, wherein the inner channel and outer channel each have a circular cross section.

6. A method of reducing cracks in a welded vane assembly comprising:
   providing a first vane assembly having:
      a first inner shroud having a first inner sidewall, an opposing second inner sidewall, an inner radial thickness extending from an inner gas path surface to a radially innermost surface of the first inner shroud, and an inner length, the first inner sidewall having a first inner groove and the second inner sidewall having a second inner groove, wherein no portion of the first inner groove or the second inner groove extends radially inward from an outermost portion of the radially innermost surface;
      a first airfoil extending radially outward from the inner gas path surface; and
      a first outer shroud coupled to the first airfoil and having a first outer sidewall, an opposing second outer sidewall, an outer radial thickness extending from an outer gas path surface to a radially outermost surface of the first outer shroud, and an outer length, the first outer sidewall having a first outer groove and the second outer sidewall having a second outer groove, wherein no portion of the first outer groove or the second outer groove extends radially outward from an innermost portion of the radially outermost surface;
   providing a second vane assembly having:
      a second inner shroud having a first inner sidewall, an opposing second inner sidewall, an inner radial thickness extending from an inner gas path surface to a radially innermost surface of the second inner shroud, and an inner length, the first inner sidewall having a first inner groove and the second inner sidewall having a second inner groove, wherein no portion of the first inner groove or the second inner groove extends radially inward from an outermost portion of the radially innermost surface;
      a second airfoil extending radially outward from the inner gas path surface; and
      a second outer shroud coupled to the second airfoil and having a first outer sidewall, an opposing second outer sidewall, an outer radial thickness extending from an outer gas path surface to a radially outermost surface of the second outer shroud, and an outer length, the first outer sidewall having a first outer groove and the second outer sidewall having a second outer groove, wherein no portion of the first outer groove or the second outer groove extends radially outward from an innermost portion of the radially outermost surface;
   positioning the first vane assembly adjacent the second vane assembly such that the first inner sidewall of the first vane assembly contacts the second inner sidewall of the second vane assembly and the first outer sidewall of the first vane assembly contacts the second outer sidewall of the second vane assembly; and,
   securing the first vane assembly to the second vane assembly along an interface region of the first and second inner shrouds and the first and second outer shrouds.

7. The method of claim 6, wherein the first vane assembly is secured to the second vane assembly by a full penetration weld that extends along the interface region of the first and second inner shrouds and first and second outer shrouds.

8. The method of claim 7, wherein the full penetration weld extends through a portion of the inner radial thickness to the channel formed by the first inner shroud and second inner shroud.

9. The method of claim 7, wherein the full penetration weld extends through a portion of the outer radial thickness to the channel formed by the first outer shroud and second outer shroud.

10. The method of claim 6 further comprising a channel formed by the inner grooves of the first and second vane assemblies and a channel formed by the outer grooves of the first and second vane assemblies.

11. The method of claim 10, wherein the channel formed between the inner shrouds and the channel formed between the outer shrouds each extend the length of the inner and outer shroud.

* * * * *